(12) United States Patent
Watanabe

(10) Patent No.: US 7,068,744 B2
(45) Date of Patent: Jun. 27, 2006

(54) SYNCHRONOUS DETECTION METHOD AND DEVICE, AND SENSOR SIGNAL DETECTOR

(75) Inventor: Takamoto Watanabe, Nagoya (JP)

(73) Assignee: Denso Corporation, Kariya (JP)

( * ) Notice: Subject to any disclaimer, the term of this patent is extended or adjusted under 35 U.S.C. 154(b) by 764 days.

(21) Appl. No.: 10/216,980

(22) Filed: Aug. 12, 2002

(65) Prior Publication Data

US 2003/0039325 A1 Feb. 27, 2003

(30) Foreign Application Priority Data

Aug. 27, 2001 (JP) ............................. 2001-256350

(51) Int. Cl.
*H03D 1/04* (2006.01)

(52) U.S. Cl. ...................................... 375/346
(58) Field of Classification Search ................ 375/346, 375/284, 267, 285; 341/144, 155, 143, 110; 455/68; 342/104, 108
See application file for complete search history.

(56) References Cited

U.S. PATENT DOCUMENTS 6,456,827 B1 * 9/2002 Kubo et al. .................... 455/68
6,653,964 B1 * 11/2003 Mizuno et al. ............. 341/155

FOREIGN PATENT DOCUMENTS

| JP | 8-032408 | 2/1996 |
| JP | 2000-081335 | 3/2000 |
| JP | 2001-153659 | 6/2001 |

* cited by examiner

*Primary Examiner*—Khai Tran
(74) *Attorney, Agent, or Firm*—Harness, Dickey & Pierce, PLC

(57) ABSTRACT

The present invention is intended to efficiently minimize high-frequency noise stemming from synchronous detection without the necessity of a low-pass filter that requires a large time constant. A vibratory gyroscope includes a synchronous detection unit that detects a sense signal sent from a sensing element using a reference signal synchronous with a monitor signal. In the vibratory gyroscope, an analog moving-average filter that produces a moving average of the detection signal by sampling the detection signal during one cycle of the reference signal is used to remove high-frequency noise components from the detection signal, which is detected to be synchronous with the reference signal, without the necessity of a CR filter that requires a large time constant. Consequently, unnecessary noise components whose frequencies are equal to the frequency of the reference signal and those of its harmonics, and which stem from synchronous detection, can be efficiently attenuated owing to an infinite attenuation frequency band offered by the analog moving-average filter.

12 Claims, 12 Drawing Sheets

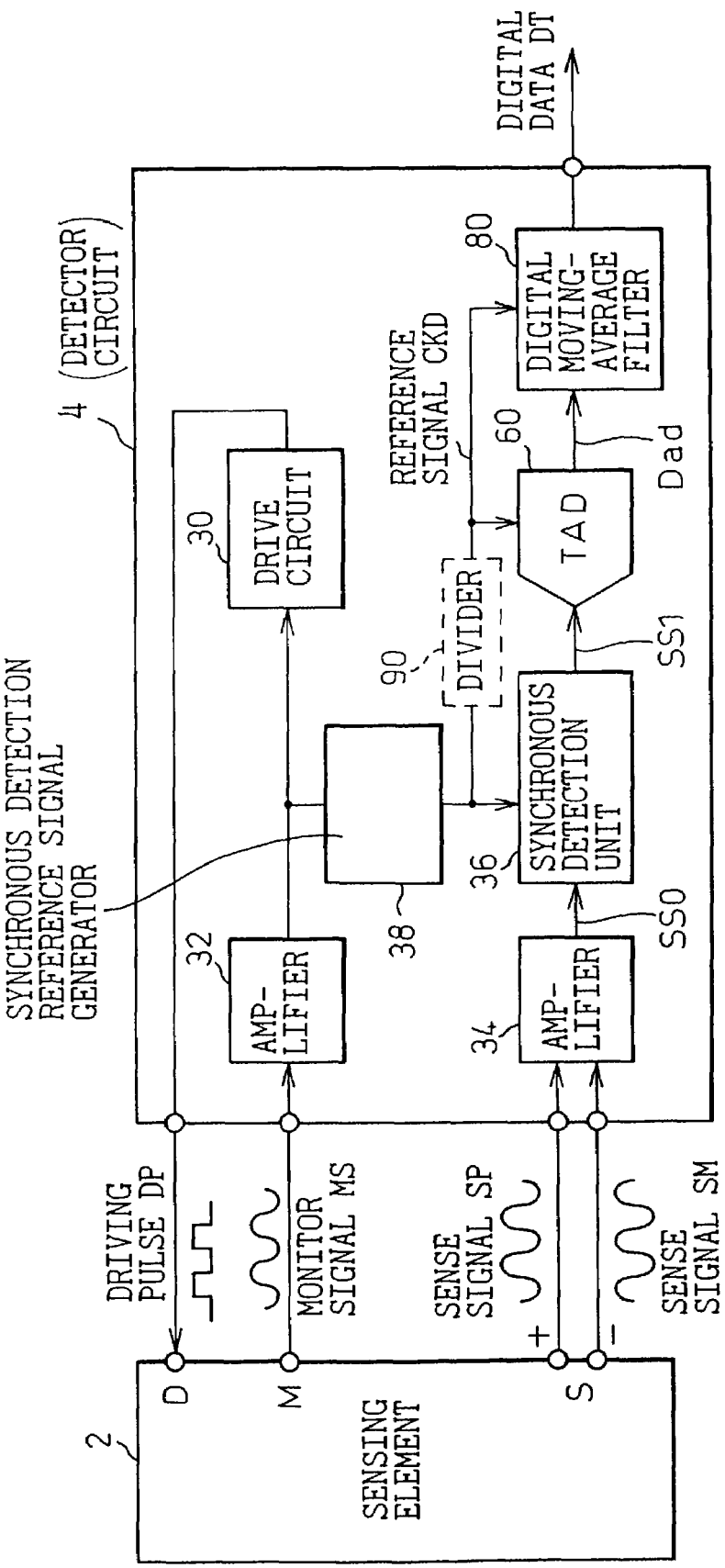

CHARACTERISTIC OF DIGITAL
MOVING-AVERAGE FILTER

SYNTHETIC CHARACTERISTIC OF ANALOG
MOVING-AVERAGE FILTER+DIGITAL
MOVING-AVERAGE FILTER

SYNCHRONOUS DETECTION METHOD AND DEVICE, AND SENSOR SIGNAL DETECTOR

BACKGROUND OF THE INVENTION

1. Field of the Invention

The present invention relates to a synchronous detection method, and a device, that are used to sample a signal component synchronous with a reference signal from an input signal, and to a sensor signal detector utilizing the synchronous detection.

2. Description of the Related Art

In the past, a synchronous detection circuit has been used to separate a desired signal component from an input signal that suffers a poor signal-to-noise ratio or to detect a phase difference of an input signal from a reference signal.

The synchronous detection circuit performs full-wave rectification on a signal, of which the frequency falls within a predetermined frequency band, using a reference signal of the frequency, and thus restores a desired signal. The synchronous detection circuit has a drawback that switching of connections through a switch and selection of a signal path are synchronized with the reference signal and this causes high-frequency noise.

The high-frequency noise degrades the signal-to-noise ratio the circuit offers. Normally, a low-pass filter such as a CR filter is installed in a stage succeeding the synchronous detection circuit. The low-pass filter removes the high-frequency noise.

However, when an attempt is made, as conventionally, to minimize the high-frequency noise, which occurs in the synchronous detection circuit, using the low-pass filter including the CR filter, a time constant required by the low-pass filter must be increased. For this purpose, the capacitance of a capacitor C included in the low-pass filter and the resistance of a resistor R included therein must be increased of the number of stages each having a capacitor and resistor connected to each other (or in other words, the order of the filter must be raised).

Consequently, the conventional synchronous detection circuit has a drawback that it cannot be designed to be compact and low-cost because of the low-pass filter included for removing the high-frequency noise.

SUMMARY OF THE INVENTION

The present invention attempts to overcome the foregoing problems. An object of the present invention is to provide a synchronous detection method and device capable of efficiently minimizing high-frequency noise, which stems from synchronous detection, without the necessity of a low-pass filter that requires a large time constant, and to provide a sensor signal detector utilizing the synchronous detection device.

In order to accomplish the foregoing object, according to the first aspect of the present invention, there is provided a synchronous detection method. Herein, an analog moving average of a signal detected to be synchronous with a reference signal is produced by sampling the signal during one cycle of the reference signal or one cycle of a signal whose frequency equals a fraction 1/m of the frequency of the reference signal (where m denotes a positive integer). Thus, high-frequency noises are removed from the detected synchronous signal. According to this method, unnecessary high-frequency noises contained in the detected synchronous signal are removed by producing an analog moving average without the necessity of a low-pass filter such as a CR filter.

The analog moving-average production is an averaging of the signal components received during a sampling cycle. The largest (theoretically infinite) magnitude of attenuation is attained relative to frequencies equal to or close to an integral multiple of the sampling rate (for example, if the sampling rate is 10 kHz, the frequencies are equal or close to 10 kHz, 20 kHz, 30 kHz, or the like).

The present inventor et al has noted that high-frequency noises stemming from synchronous detection are harmonics of a reference signal used for synchronous detection. For example, when the reference signal has a frequency of 10 kHz, the frequencies of the high-frequency noises are equal or close to 10 kHz, 20 kHz, 30 kHz, 40 kHz, or the like. Thus, the high-frequency noises have frequencies equal or close to an integral multiple of the frequency of the reference signal. Moreover, as far as the analog moving-average production is concerned, the infinite magnitude of attenuation is attained relative to frequencies equal or close to an integral multiple of a sampling rate at which samples are acquired in order to produce an analog moving average. The analog moving-average production is therefore performed by acquiring samples during one cycle of the reference signal used for synchronous detection or one cycle of a signal whose frequency equals a fraction 1/m of the frequency of the reference signal (where m denotes a positive integer). (In other words, the sampling rate at which samples are acquired in order to produce an analog moving average is set to the same value as the frequency of the reference signal or a fraction 1/m of the frequency of the reference signal.) Thus, the unnecessary high-frequency noise components stemming from synchronous detection are efficiently attenuated through analog moving-average production.

Whatever configuration an analog moving-average production circuit has, the principle of the circuit is such that an infinite magnitude of attenuation is attained relative to frequencies equal or close to an integral multiple of a sampling rate. According to the present invention, high-frequency noise stemming from synchronous detection can be successfully minimized without the necessity of a low-pass filter that requires a large time constant and that is employed conventionally. Consequently, a synchronous detection circuit (device) can be formed with a simpler configuration than conventionally. According to the synchronous detection method in which the present invention is implemented, the synchronous detection circuit (device) can be designed to be compact and low-cost.

The analog moving-average production circuit may have any configuration as long as it can sample a signal, which is detected to be synchronous with a reference signal, during a certain cycle and average acquired samples. More particularly, a delay line filter disclosed in, for example, Japanese Unexamined Patent Application Publication No. 8–32408 will do.

As mentioned above, noise components whose frequencies are equal or close to an integral multiple of the frequency of a reference signal that is superposed on a signal detected to be synchronous with the reference signal can be efficiently minimized by utilizing the analog moving-average production. However, a high-frequency noise other than the noise components stemming from synchronous detection (that is, a noise component whose frequency is not equal or close to the integral multiple of the frequency of the reference signal) may be superposed on the detected synchronous signal. The high-frequency noise may presumably not be minimized through the analog moving-average production alone.

In this case, preferably, a signal produced as an analog moving average may be filtered using a low-pass filter in order to remove a residual noise contained in the analog moving-average signal.

Nevertheless, since a signal having high-frequency noise, which includes harmonics of the reference signal, removed through the analog moving-average production is applied to the low-pass filter, the time constant required by the low-pass filter need not be as large as it conventionally is. The low-pass filter may have simpler circuitry. This results in a compact and low-cost synchronous detection circuit (device).

The low-pass filter may be formed with an analog filter such as a CR filter that has been generally adopted in the past. Alternatively, a digital moving-average filter may be adopted.

According to the synchronous detection method, preferably, a signal produced as an analog moving average is analog-to-digital (A/D) converted. Thereafter, the resultant signal is sampled during a cycle corresponding to the cycle during which samples are acquired in order to produce an analog moving average or during 1/n of the cycle (where n denotes a positive integer). A plurality of acquired samples is then averaged. This digital moving-average production can minimize residual noise contained in the analog moving-average signal.

According to the synchronous detection method, preferably, the digital moving-average production is performed by acquiring samples at a sampling rate, that is, during a cycle corresponding to the cycle during which samples are acquired in order to produce an analog moving average or 1/n (where n denotes a positive integer) of the cycle. If the sampling rate at which samples are acquired for producing a digital moving average is set this way, a passband for unnecessary signals stemming from digital moving-average production matches a frequency band relative to which an infinite magnitude of attenuation can be attained during analog moving-average production.

Specifically, the digital moving-average production is such that digital data is sampled at a sampling rate, and a plurality of sampled past digital data items is averaged. A magnitude of attenuation at which a signal is attenuated through the digital moving-average production is very small (nearly nil) relative to frequencies equal or close to an integral multiple of the sampling rate. Unnecessary signal components therefore pass because they have frequencies equal or close to the integral multiple of the sampling rate. In contrast, during the analog moving-average production, a maximum (theoretically infinite) magnitude of attenuation is attained relative to the frequencies equal or close to the integral multiple of the sampling rate. The unnecessary signal components are therefore cut off because they have frequencies equal or close to an integral multiple of the sampling rate.

According to the synchronous detection method, preferably, the capability of a low-pass filter for removing a residual noise from a signal produced as an analog moving average is realized by performing the digital moving-average production. At this time, a sampling rate at which samples are acquired for producing a digital moving average is set to the same value as a sampling rate at which samples are acquired for producing an analog moving average or an n multiple of the sampling rate. Signal components that cannot be attenuated through the digital moving-average production (in this case, high-frequency noise components stemming from synchronous detection) are attenuated through the analog moving-average production. Thus, unnecessary noise components are prevented from remaining unprocessed through the digital moving-average production.

Moreover, according to the synchronous detection method, preferably, an analog moving average of a signal detected to be synchronous with a reference signal is produced, and then is analog-to-digital (A/D) converted. These processing steps (that is, the analog moving-average production and A/D conversion) can be achieved simultaneously using a pulse delay circuit that has a plurality of stages of delay units connected in tandem.

Preferably, the signal detected to be synchronous with the reference signal is applied to the pulse delay circuit as a signal with which the delay units constituting the pulse delay circuit are controlled. A pulsating signal is also applied to the pulse delay circuit. The pulsating signal is transferred while being delayed by a delay time produced by each delay unit included in the pulse delay circuit. The number of delay units through which the pulsating signal has passed within the pulse delay circuit is counted during one cycle of the reference signal or one cycle of a signal whose frequency equals to a fraction 1/m of the frequency of the reference signal. Consequently, the pulse delay circuit can be used to perform concurrently analog moving-average production on the signal detected to be synchronous with the reference signal and analog-to-digital (A/D) conversion on a signal produced as an analog moving average.

Specifically, when the pulse delay circuit is actuated as mentioned above, the delay time by which the pulsating signal is delayed while passing through each of the delay units constituting the pulse delay circuit varies depending on the voltage level of an analog input signal. If unnecessary high-frequency signal components are superposed on the analog input signal, the delay time varies depending on the high-frequency noise components. However, as the pulsating signal passes through the delay units, the variations caused by the high-frequency noise components are canceled out. When the pulsating signal passes through the plurality of delay units, an average of the delay times produced by the delay units is proportional to the voltage level of the analog input signal having the high-frequency signal components removed.

According to the synchronous detection method, preferably, the pulse delay circuit operates as mentioned above. The number of delay units through which the pulsating signal has passed within the pulse delay circuit is counted during one cycle of the reference signal used for synchronous detection or one cycle of a signal whose frequency equals a fraction 1/m of the frequency of the reference signal (where m denotes a positive integer). An average of the times the pulsating signal is required to pass through the delay units is calculated, and is transmitted as digital data representing the signal produced as the analog moving average.

According to the synchronous detection method, therefore, analog moving-average production and analog-to-digital (A/D) conversion can be achieved using one circuit, which includes the pulse delay circuit, without the necessity of constructing an analog moving-average production circuit and a combination of a filter and an A/D circuit. This facilitates realization of a compact and low-cost synchronous detection circuit (device).

According to the second aspect of the present invention, there is provided a synchronous detection device in which a synchronous detection circuit detects an input signal using a reference signal of a predetermined frequency. Moreover, an analog moving-average filter produces a moving average of a signal, which is detected to be synchronous with the reference signal, during one cycle of the reference signal or one cycle of a signal whose frequency equals a fraction 1/m of the frequency of the reference signal (where m denotes a positive integer).

In the synchronous detection device in which the second aspect of the present invention is implemented, an input signal synchronous with the reference signal can be detected according to the synchronous detection method in which the first aspect thereof is implemented. Unnecessary high-frequency noise components (harmonics of the reference signal) stemming from synchronous detection can be efficiently minimized without the necessity of a low-pass filter that requires a large time constant. This results in a compact and low-cost synchronous detection device.

In the synchronous detection device in which the second aspect of the present invention is implemented, preferably, a signal produced as an analog moving average is filtered using a low-pass filter. Residual noise contained in the analog moving-average signal can be removed.

Therefore, in the synchronous detection device, the input signal synchronous with the reference signal can be detected according to the synchronous detection method in which the first aspect is implemented. Unnecessary noise components contained in the signal detected to be synchronous with the reference signal can be removed more reliably.

Preferably, the synchronous detection device includes an analog-to-digital (A/D) converter that A/D converts a signal produced as an analog moving average. Moreover, the capability of a low-pass filter is realized with a digital moving-average filter that produces a digital moving average.

In the synchronous detection device, therefore, the input signal synchronous with the reference signal can be detected according to the synchronous detection method in which the first aspect is implemented. Unnecessary noise components contained in the signal detected to be synchronous with the reference signal can be removed more reliably.

In the synchronous detection device, preferably, the capabilities of the analog moving-average filter and analog-to-digital (A/D) converter are realized with a temporal A/D converter with the capability of a filter.

The temporal A/D converter includes a pulse delay circuit and a count means. The pulse delay circuit has a plurality of stages of delay units, each of which delays an input pulse by a delay time dependent on a signal detected to be synchronous with a reference signal, connected in tandem. The pulse delay circuit transfers a pulsating signal while delaying it by a delay time produced by each delay unit. The count means counts the number of delay units, through which the pulsating signal has passed within the pulse delay circuit, during one cycle of a reference signal used for synchronous detection or one cycle of a signal whose frequency equals a fraction 1/m of the frequency of the reference signal (where m denotes a positive integer). A count value provided by the count means is transmitted as digital data representing the signal detected to be synchronous with the reference signal.

Specifically, the synchronous detection device detects an input signal synchronous with the reference signal according to the aforesaid synchronous detection method. The temporal A/D converter with the capability of a filter is used to concurrently perform analog moving-average production on the signal detected to be synchronous with the reference signal and A/D conversion on the signal produced as an analog moving average.

Consequently, the synchronous detection device can be formed with simpler circuitry, and can be designed to be compact and low-cost.

According to the third, fourth, and fifth aspects of the present invention, there are provided sensor signal detectors that sample a real sensor signal from a detection signal sent from a sensing element (or in other words, a sensor element) according to the synchronous detection method in accordance with the present invention.

In the sensor signal detector in which the third aspect of the present invention is implemented, a drive means drives the sensing element with a driving signal that has a carrier superposed thereon. A first reference signal generation means generates a first reference signal, which is used for synchronous detection, according to the carrier. A first synchronous detection means detects a detection signal sent from the sensing element using the first reference signal. Thus, a sensor signal representing a physical quantity detected using the sensing element is generated.

According to the third aspect of the resent invention, the sensor signal detector superposes the carrier on the driving signal with which the sensing element is driven, and thus superposes the detection signal, which is sent from the sensing element, on the carrier. Furthermore, the detection signal is detected using the reference signal synchronous with the carrier. Consequently, the finally produced sensor signal is unaffected by a 1/f noise (low-frequency noise) occurring in an amplification circuit or the like installed on a path along which the detection signal sent from the sensing element is received.

In the sensor signal detector, preferably, the aforesaid synchronous detection device is adopted as the first synchronous detection means so that the detection signal synchronous with the reference signal can be detected according to the method in which the present invention is implemented.

According to the third aspect of the present invention, the sensor signal detector can produce the real sensor signal, which represents the physical quantity detected using the sensing element, while being unaffected by the 1/f noise and the high-frequency noises. Herein, the 1/f noise occurs in an amplification circuit or the like installed on the path along which the detection signal sent from the sensing element is received. Moreover, the high-frequency noise stems from synchronous detection performed by the first synchronous detection means. Consequently, the sensor signal detector offers a very high signal-to-noise ratio.

According to the fourth aspect of the present invention, there is provided a sensor signal detector that detects a physical quantity such as an acceleration or an angular velocity using a vibratory sensing element such as a tuning fork or a diaphragm. A drive means drives the sensing element with a driving signal of a predetermined frequency. A second reference signal generation means detects the driven state of the sensing element from the driving signal or a monitor signal sent from the sensing element. The second reference signal generation means generates a second reference signal, which is used for synchronous detection, using the driving signal or monitor signal. A second synchronous detection means detects a detection signal, which is sent from the sensing element, using the second reference signal. Consequently, a sensor signal representing a physical quantity detected using the sensor element is generated.

Even in the sensor signal detector in which the fourth aspect of the present invention is implemented, the aforesaid synchronous detection device is adopted as the second synchronous detection means so that the detection signal synchronous with the reference signal can be detected according to the method in which the present invention is implemented.

According to the fourth aspect of the present invention, the sensor signal detector produces the real sensor signal, which represents the physical quantity such as an acceleration or an angular velocity, while being unaffected by high-frequency noises stemming from synchronous detection performed by the second synchronous detection means. Herein, the physical quantity is detected by the vibratory sensing element. Consequently, the sensor signal detector can offer a very high signal-to-noise ratio.

According to the fifth aspect of the present invention, there is provided a sensor signal detector wherein, similarly to the sensor signal detector in accordance with the fourth aspect, a drive means drives a sensing element with a driving signal of a predetermined frequency. A second reference signal generation means detects the driven state of the sensing element from the driving signal or a monitor signal sent from the sensing element, and generates a second reference signal, which is used for synchronous detection, using the driving signal or monitor signal.

In the sensor signal detector in which the fifth aspect of the present invention is implemented, similarly to the sensor signal detector in accordance with the third aspect, preferably, a carrier superposition means superposes a carrier, of which the frequency is higher than that of the driving signal with which the drive means drives the sensing element, on the driving signal. Thus, the carrier is superposed on the detection signal sent from the sensing element. A first reference signal generation means generates a first reference signal, which is used for synchronous detection, according to the carrier.

A first synchronous detection means detects the detection signal sent from the sensing element using the first reference signal. A second synchronous detection means detects the detection signal detected to be synchronous with the reference signal using the second reference signal.

According to the fifth aspect of the present invention, the sensor signal detector is a combination of the one in accordance with the third aspect and the one in accordance with the fourth aspect. Consequently, when the vibratory sensing element such as a tuning fork or a diaphragm is used to detect a physical quantity such as an acceleration or an angular velocity, a finally produced sensor signal is unaffected by a 1/f noise (low-frequency noise) occurring in an amplification circuit or the like installed on a path along which the detection signal sent from the sensing element is received.

Even in the sensor signal detector in which the fifth aspect of the present invention is implemented, the aforesaid synchronous detection device is adopted as the first and second synchronous detection means so that the detection signal synchronous with the reference signal can be detected according to the method in which the present invention is implemented.

According to the fifth aspect of the present invention, therefore, the sensor signal detector can produce a real sensor signal, which represents a physical quantity such as an acceleration or an angular velocity, while being unaffected by the 1/f noise or high-frequency noises. Herein, the physical quantity is detected by the vibratory sensing element. The 1/f noise occurs in an amplification circuit or the like installed on a path along which the detection signal sent from the sensing element is received. The high-frequency noises stem from synchronous detection performed by the first or second synchronous detection means. Consequently, the sensor signal detector offers a very high signal-to-noise ratio.

According to the fourth or fifth aspect of the present invention, the vibratory sensing element included in the sensor signal detector may be a vibrator included in a vibratory gyroscope. If the sensor signal detector in accordance with the fourth or fifth aspect thereof is used to process a detection signal sent from the vibrator included in the vibratory gyroscope, an angular velocity detector capable of highly precisely detecting an angular velocity (yaw rate) detected using the vibratory gyroscope can be realized.

BRIEF DESCRIPTION OF THE DRAWINGS

FIG. 10 is a block diagram showing the configuration of an angular velocity detector to which the third embodiment is adapted;

DESCRIPTION OF THE PREFERRED EMBODIMENTS

Embodiments (the first to third embodiments) of the present invention will be described, in conjunction with the drawings, below.

First Embodiment

Figure 1:
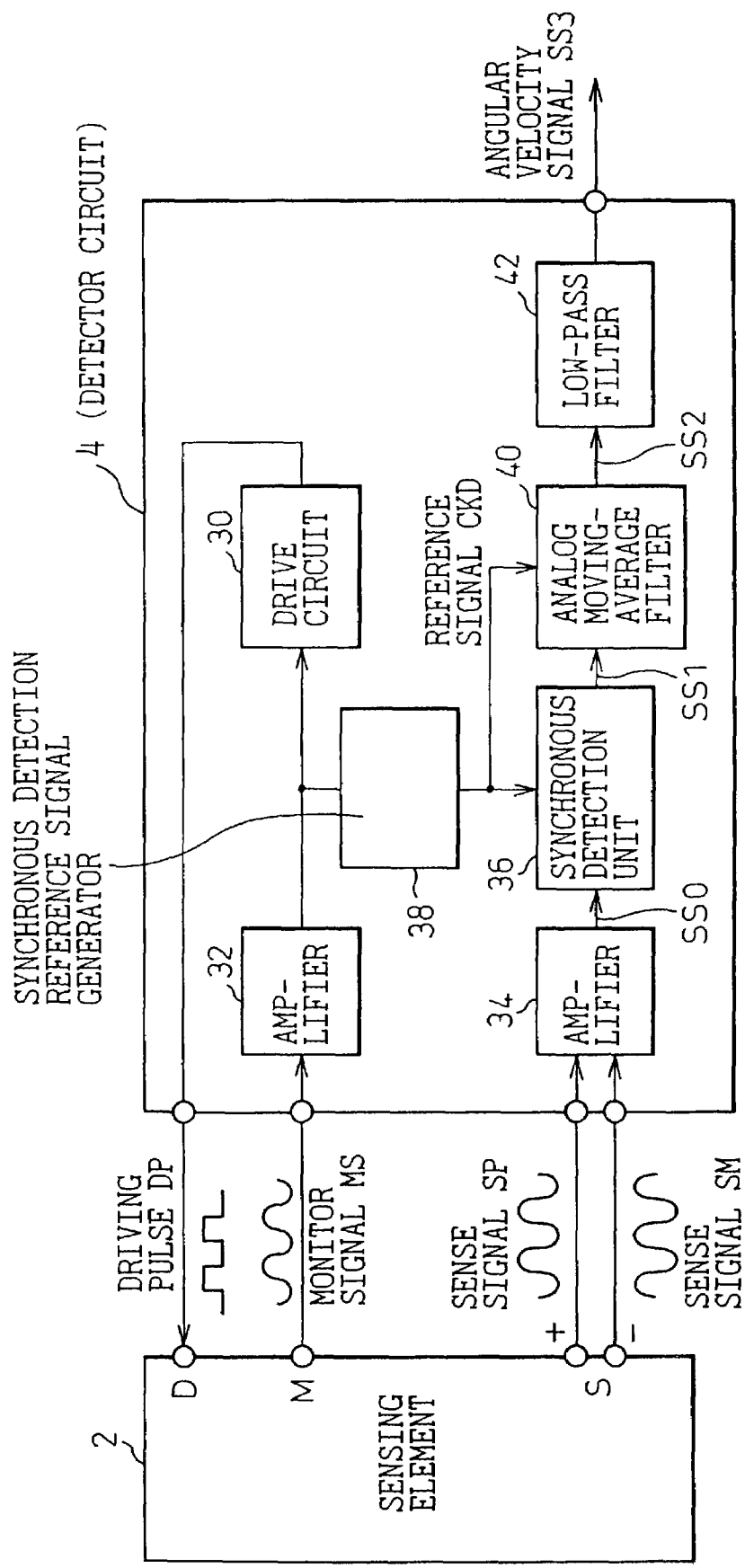
FIG. 1 is a block diagram showing the configuration of an angular velocity detector to which the first embodiment of the present invention is adapted.

FIG. 1 is a block diagram showing the overall configuration of an angular velocity detector to which the first embodiment of the present invention is adapted.

The angular velocity detector of the present embodiment is a so-called vibratory gyroscope. The angular velocity detector consists of a sensing element 2 that is a vibrator, and a detector circuit 4 (corresponding to a sensor signal detector in accordance with the present invention) that drives the sensing element 2 and detects an angular velocity at which the angular displacement of the vibrator has changed due to an external factor.

Figure 2:
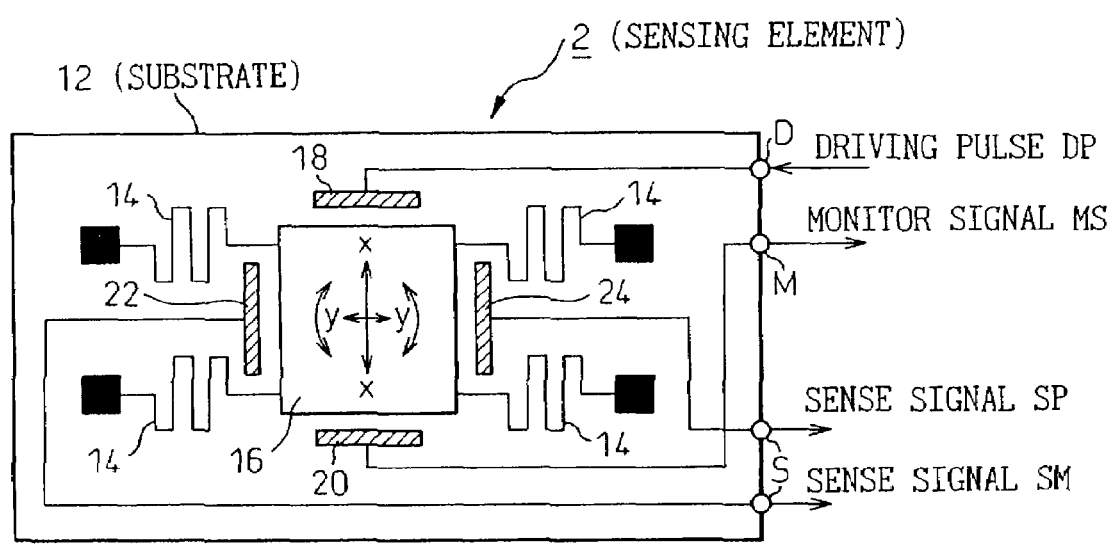
FIG. 2 is an explanatory diagram for explaining the structure of a sensing element included in the first embodiment.

The sensing element 2 has, for example, as shown in FIG. 2, a substantially rectangular vibrator 16 mounted on a substrate 12 made of a monocrystalline silicon or the like by way of four beams 14 extending from the corners of the substrate. A driving electrode 18, a monitor electrode 20, and a pair of detection electrodes 22 and 24 are disposed around the vibrator 16. The driving electrode 18 is used to vibrate the vibrator 16 in an x-axis direction parallel to the surface of the substrate (vertical direction in the drawing). The monitor electrode 20 is used to monitor the driven state of the vibrator 16 (or in other words, the vibrations of the vibrator 16 in the x-axis direction). The pair of detection electrodes 22 and 24 is used to detect the vibrations of the vibrator 16 in a y-axis direction parallel to the surface of the substrate (perpendicular to the x-axis direction).

FIG. 2 illustratively shows the vibrator 16 and electrodes 18 to 24. In reality, the vibrator 16 has electrodes associated with the electrodes 18 to 24 so that an electrostatic capacitance between the vibrator 16 and each of the electrodes 18 to 24 will vary depending on the angular displacement of the vibrator 16. Moreover, the electrodes on the vibrator 16 and the electrodes 18 to 24 on the substrate that are stationary electrodes are shaped like combs so that each pair of associated electrodes can be meshed with each other. The sensing element 2 included in the present embodiment is already known as a sensing element for a so-called micro-gyroscope constructed by exploiting a micro-machine technology (for example, refer to Japanese Unexamined Patent Application Publication Nos. 2000–81335 and 2001–153659). The description of the sensing element 2 will therefore be omitted.

The detector circuit 4 consists mainly of a drive circuit 30 and an amplifier 32. The drive circuit 30 applies a driving pulse DP, of which the frequency equals the resonant frequency of the vibrator 16, to the driving electrode 18 through a driving terminal D formed on the sensing element 2. This causes electrostatic force to occur between the driving electrode 18 and vibrator 16. The drive circuit 30 thus vibrates the vibrator 16 in the x-axis direction. The amplifier 32 reads a monitor signal MS, which represents the driven state of the vibrator 16 and is developed at the monitor electrode 20, through a monitor terminal M formed on the sensing element 2, and amplifies the monitor signal MS. The amplified signal is fed back to the drive circuit 30. Consequently, the vibrator 16 included in the sensing element 2 vibrates in the x-axis direction at its resonant frequency.

Moreover, when the vibratory 16 is vibrating as mentioned above, an external factor causing the angle, which is defined with the vibrations made with respect to an axis crossing the surface of the substrate, to change at an angular velocity may be applied to the sensing element 2. In this case, a Coriolis force is produced in a direction orthogonal to a direction in which the vibrator 16 vibrates (x-axis direction). The Coriolis force causes the vibrator 16 to vibrate in the y-axis direction.

Consequently, an electrostatic capacitance present between the vibrator 16 and each of the detection electrodes 22 and 24, which are opposed to each other in the y-axis direction with the vibrator 16 between them, varies. Eventually, sense signals SP and SM proportional to the variations of the electrostatic capacitances (or in other words, Coriolis forces occurring in the vibrator 16) are produced. Incidentally, the sense signals SP and SM are 180° out of phase with each other.

The detector circuit 4 has a differential amplifier 34 that receives the sense signals SP and SM through a pair of sense terminals S formed on the sensing element 2. The differential amplifier 34 amplifies a difference between the sense signals, and transfers the resultant difference to a synchronous detection unit 36.

The synchronous detection unit 36 corresponds to a synchronous detection circuit in accordance with the present invention. The synchronous detection unit 36 detects a sense signal SS0, which is sent from the differential amplifier 34, using a reference signal CKD. A synchronous detection reference signal generator 38 produces the reference signal CKD using the monitor signal MS sent from the amplifier 32. Consequently, the synchronous detection unit 36 performs full-wave rectification on the sense signal SS0 sent from the differential amplifier 34 synchronously with the reference signal CKD. Incidentally, the synchronous detection reference signal generator 38 produces the reference signal CKD by shifting the phase of the monitor signal MS by, for example, 90°.

Thereafter, a signal (detection signal SS1) detected to be synchronous with the reference signal by the synchronous detection unit 36 is transferred to an analog moving-average filter 40. The analog moving-average filter 40 receives the reference signal CKD that is used for synchronous detection, and averages samples of a detection signal SS1 acquired during one cycle of the reference signal CKD. For example, a delay line filter disclosed in the Japanese Unexamined Patent Application Publication No. 8–32408 is employed.

A detection signal SS2 produced as an analog moving average by the analog moving-average filter 40 is transferred to a low-pass filter 42 in the last stage. The low-pass filter 42 filters the detection signal SS2 so as to remove high-frequency noises. Thereafter, the resultant signal is transferred as a sensor signal (angular velocity signal) SS3, which represents the result of detection of an angular velocity, to an external system (for example, a vehicle posture control system).

The low-pass filter 42 is included as an auxiliary filter for removing a high-frequency noise that cannot be removed through analog moving-average calculation performed by the analog moving-average filter 40. An analog filter such as a CR filter can be adopted as the low-pass filter 42. If an analog-to-digital (A/D) converter is included for converting the detection signal SS2 into digital data, the capability of the low-pass filter 42 may be realized with a digital moving-average filter that produces a moving average of digital data produced by the A/D converter.

The operation of the detector circuit 4 included in the present embodiment and having the foregoing circuitry will be described in conjunction with FIG. 3 and FIG. 4.

Figure 3:
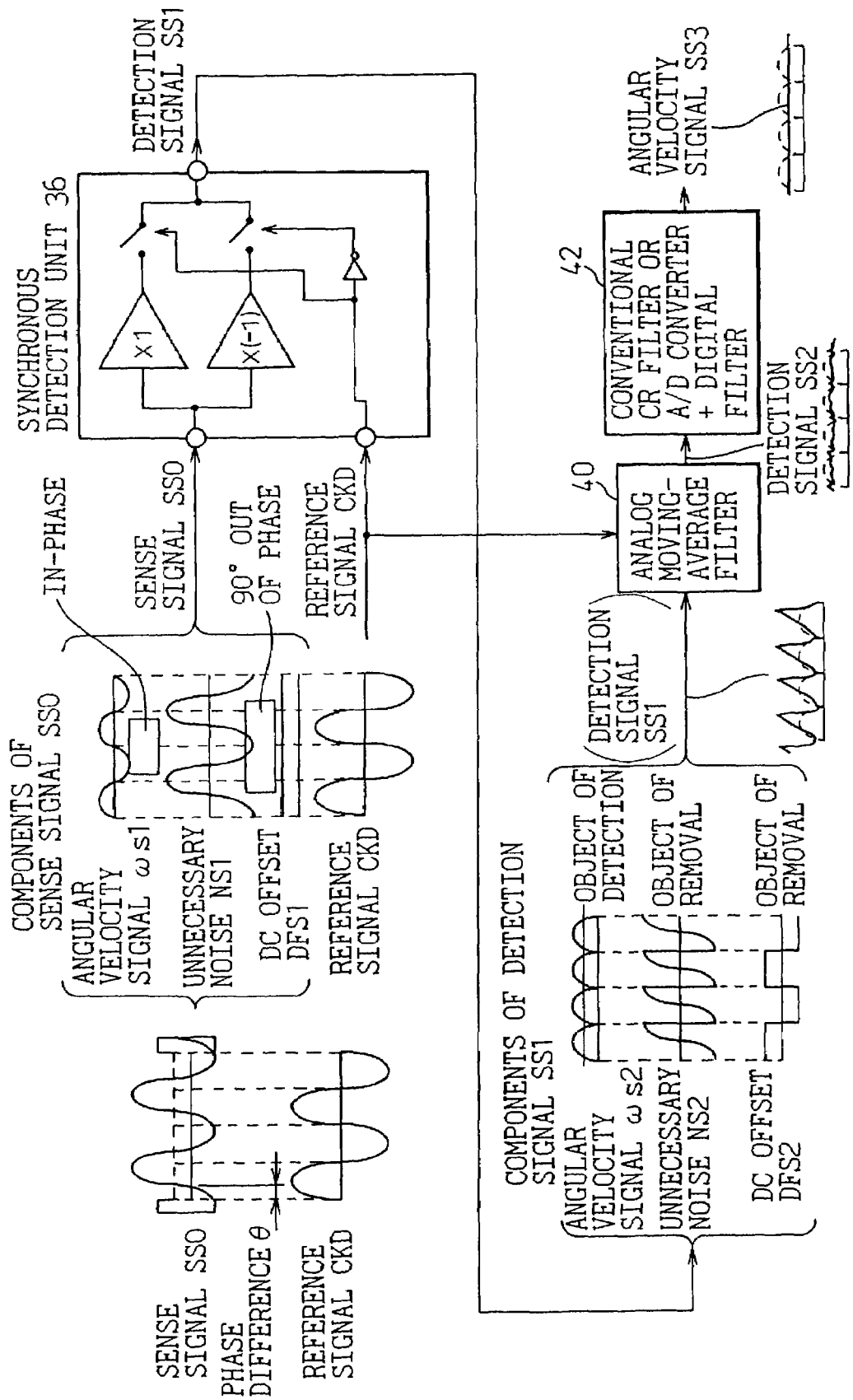
FIG. 3 is an explanatory diagram for explaining the waveforms of signals detected at various points in a detection circuit included in the first embodiment.

To begin with, as shown in FIG. 3, the sense signal SS0 produced by the differential amplifier 34 contains, in addition to an angular velocity signal component $\omega s1$ that is an object of detection, an unnecessary noise component NS1 and a dc offset component DFS1.

In general, the unnecessary noise component NS1 contained in the sense signal SS0 and the reference signal CKD are 90° out of phase with each other (have a phase difference θ). Needless to say, the phase difference between the angular velocity signal component ωs1 and reference signal CKD is 0° (or 180°).

When the synchronous detection unit 36 detects the sense signal SS0 using the reference signal CKD, the angular velocity signal component ωs1 is converted into a dc signal ωs2 whose waveform resembles a sine wave having undergone full-wave rectification. The positive and negative half-cycles of each of the unnecessary noise component NS2 and dc offset component DFS2 contained in the sense signal detected to be synchronous with the reference signal become equal to each other. An average of the half-cycles of the unnecessary noise component or dc offset component becomes 0.

The detection signal SS1 detected to be synchronous with the reference signal is a synthetic signal of the signal components ωs2, NS2, and DFS2. Herein, as the unnecessary noise component NS2 is large relative to the other components, the detection signal SS1 has a saw-tooth waveform (a so-called saw-tooth wave).

In the present embodiment, the analog moving-average filter 40 is substituted for a convention analog filter such as a CR filter in order to remove the saw-tooth wave component. The analog moving-average filter 40 is used to cancel the saw-tooth wave component, and the low-pass filter 42 is used to remove a noise component that cannot be removed by the analog moving-average filter 40. Finally, a sensor signal (angular velocity signal) SS3 is produced.

The principal idea is that the analog moving-average filter 40 offers a maximum (theoretically, infinite) magnitude of attenuation relative to frequencies equal or close to an integral multiple of a sampling rate determined with the cycle of the reference signal CKD.

Figure 4:
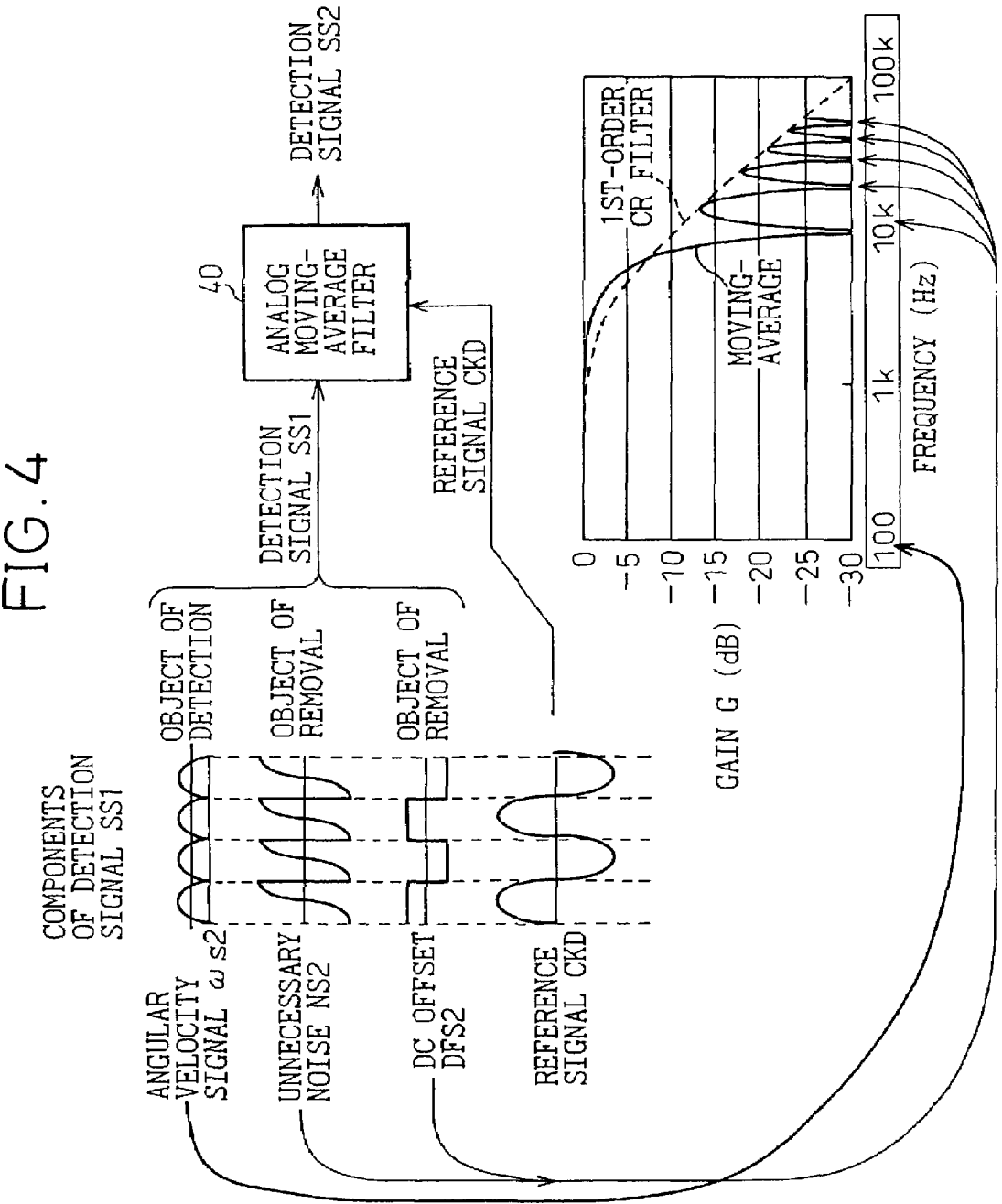
FIG. 4 is an explanatory diagram for explaining an effect of noise minimization exerted by an analog moving-average filter included in the first embodiment.

As shown in FIG. 4, assuming that the reference signal CKD has a frequency of 10 kHz, a moving average of an input signal is produced by sampling the signal over 100 μsec. Therefore, unlike a conventional first-order CR filter, the analog moving-average filter does not offer a magnitude of attenuation that smoothly varies depending on a frequency. Instead, the analog moving-average filter offers a maximum (theoretically, an infinite) magnitude of attenuation relative to frequencies equal or close to an integral multiple of the frequency of the reference signal CKD, such as, 10 kHz, 20 kHz, 30 kHz, etc.

In contrast, the frequency of the angular velocity signal component ωs2 among the signal components ωs2, NS2, and DFS2 constituting the detection signal SS1 is equal to or lower than the frequency of the reference signal CKD (10 kHz). The unnecessary noise component NS2 stemming from synchronous detection has frequencies equal to the frequency of the reference signal CKD (10 kHz) and the frequencies of its harmonics (20 kHz, 30 kHz, etc.). Moreover, the frequency of the dc offset component DFS2 is equal to the one of the reference signal CKD (10 kHz).

Consequently, among the signal components ωs2, NS2, and DFS2 constituting the detection signal SS1, the angular velocity signal component ωs2 passes through the analog moving-average filter 40. However, the unnecessary noise component NS2 and dc offset component DFS2 are removed by the analog moving-average filter 40 because their frequencies fall within an infinite attenuation frequency band offered by the analog moving-average filter. Consequently, the analog moving-average filter 40 can fully remove the unnecessary signal components stemming from the operation of the synchronous detection unit 36.

The angular velocity detector to which the present embodiment is adapted does not employ, unlike a conventional detection device, a high-order CR filter requiring a large time constant. Nevertheless, the angular velocity detector can efficiently remove an unnecessary noise component (the aforesaid saw-tooth wave) from the detection signal SS1 detected to be synchronous with the reference signal. This results in the compact and low-cost detector circuit 4.

Figure 5A:
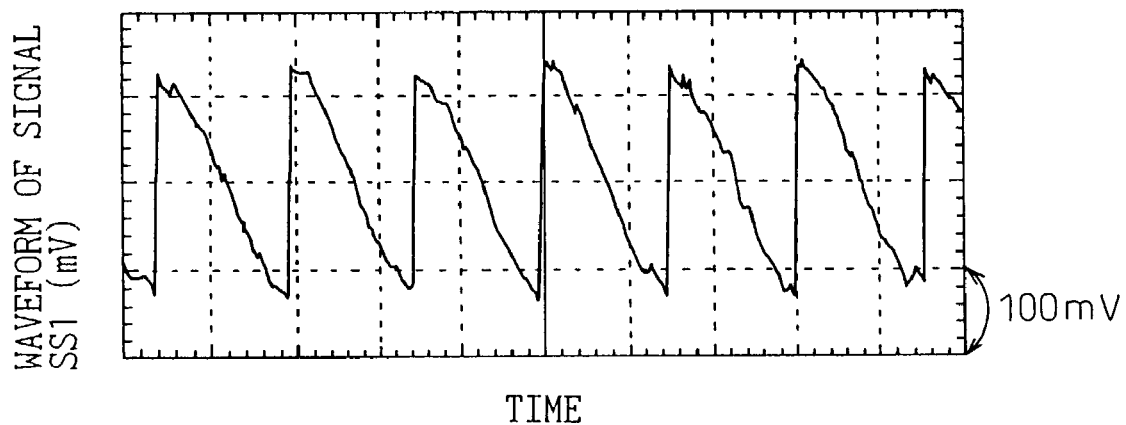
FIG. 5A and FIG. 5B are graphs of measured data expressing the waveform of a detection signal SS1 and measured data expressing the frequency components of the detection signal SS1.
Figure 5B:
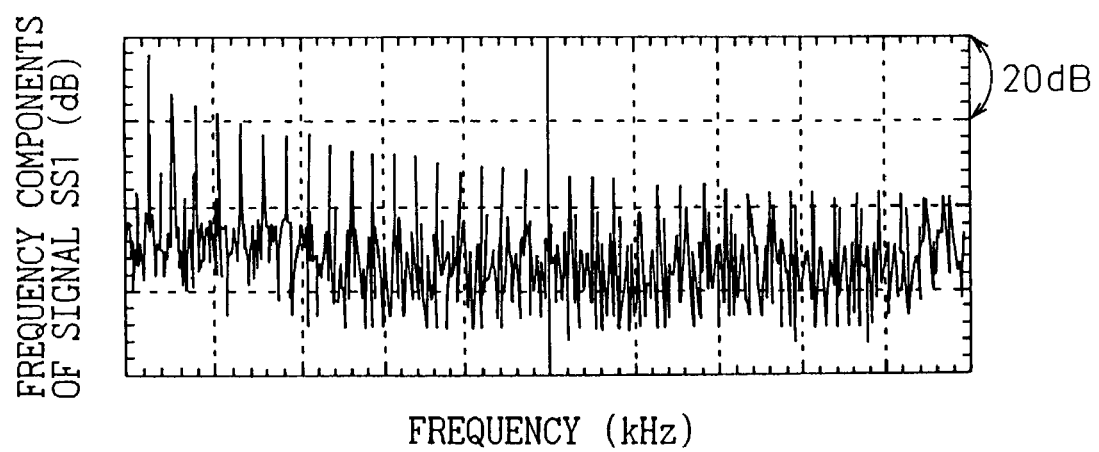
Figure 6:
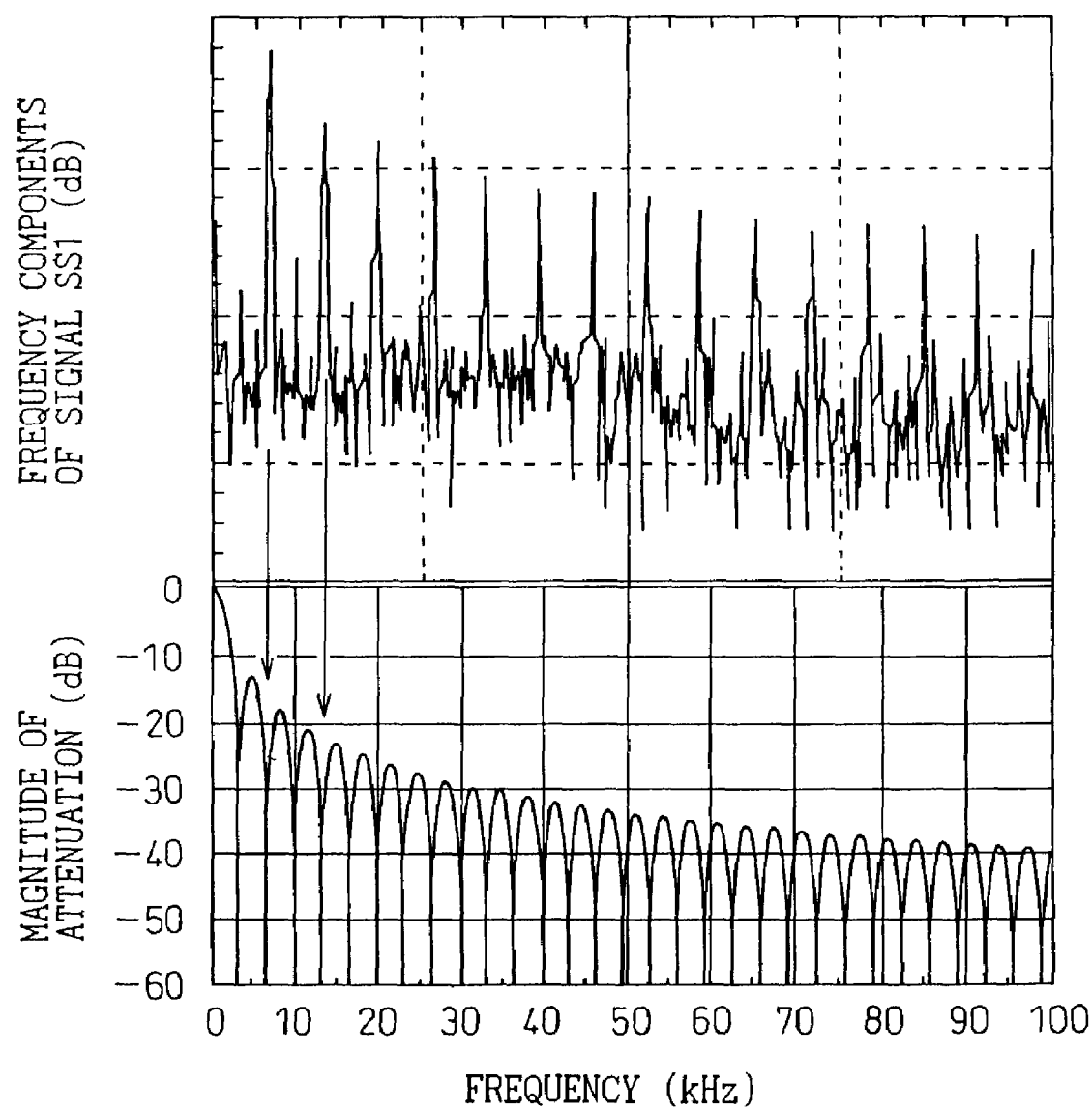
FIG. 6 is an explanatory diagram showing the relationship of correspondence between the attenuation characteristic of an analog moving-average filter and the frequency characteristic of a detection signal.

FIG. 5A and FIG. 5B show measured data expressing the waveform of the detection signal SS1 and measured data expressing the frequency components of the detection signal SS1. Herein, the sensing element 2 is driven (vibrated) with a driving pulse DP that has a frequency of 3.3 kHz. The sense signal SS0 is detected using the reference signal CKD that has a frequency of 3.3 kHz and that is synchronous with the driving pulse DP (more particularly, the monitor signal MS). Consequently, the detection signal SS1 is produced. FIG. 6 shows measured data expressing an attenuation characteristic offered by the analog moving-average filter 40, which is actuated in the timing of the reference signal CKD that has been used for synchronous detection, and measured data expressing the frequency components of a detection signal.

As is apparent from the above data items, a high-frequency noise (saw-tooth wave) contained in the detection signal SS1 is dominated by a frequency component of a frequency equal to an integral multiple of the frequency of the reference signal used for synchronous detection. In the present embodiment, the analog moving-average filter 40 that operates in the timing of the reference signal is disposed in a stage succeeding the synchronous detection unit 36. Therefore, the high-frequency noise contained in the detection signal SS1 can be efficiently removed owing to the attenuation characteristic (infinite attenuation frequency band) offered by the analog moving-average filter.

According to the present embodiment, the analog moving-average filter 40 is activated at the timing of the reference signal CKD used for synchronous detection. Alternatively, the analog moving-average filter 40 may be actuated in the timing of a signal whose frequency equals, for example, a fraction 1/m (where m denotes a positive integer) of the frequency of the reference signal CKD. Even in this case, the frequencies of the reference signal and its harmonics fall within the infinite attenuation frequency band offered by the analog moving-average filter 40. Similarly to the aforesaid embodiment, the high-frequency noises stemming from synchronous detection can be removed.

Second Embodiment

Figure 7:
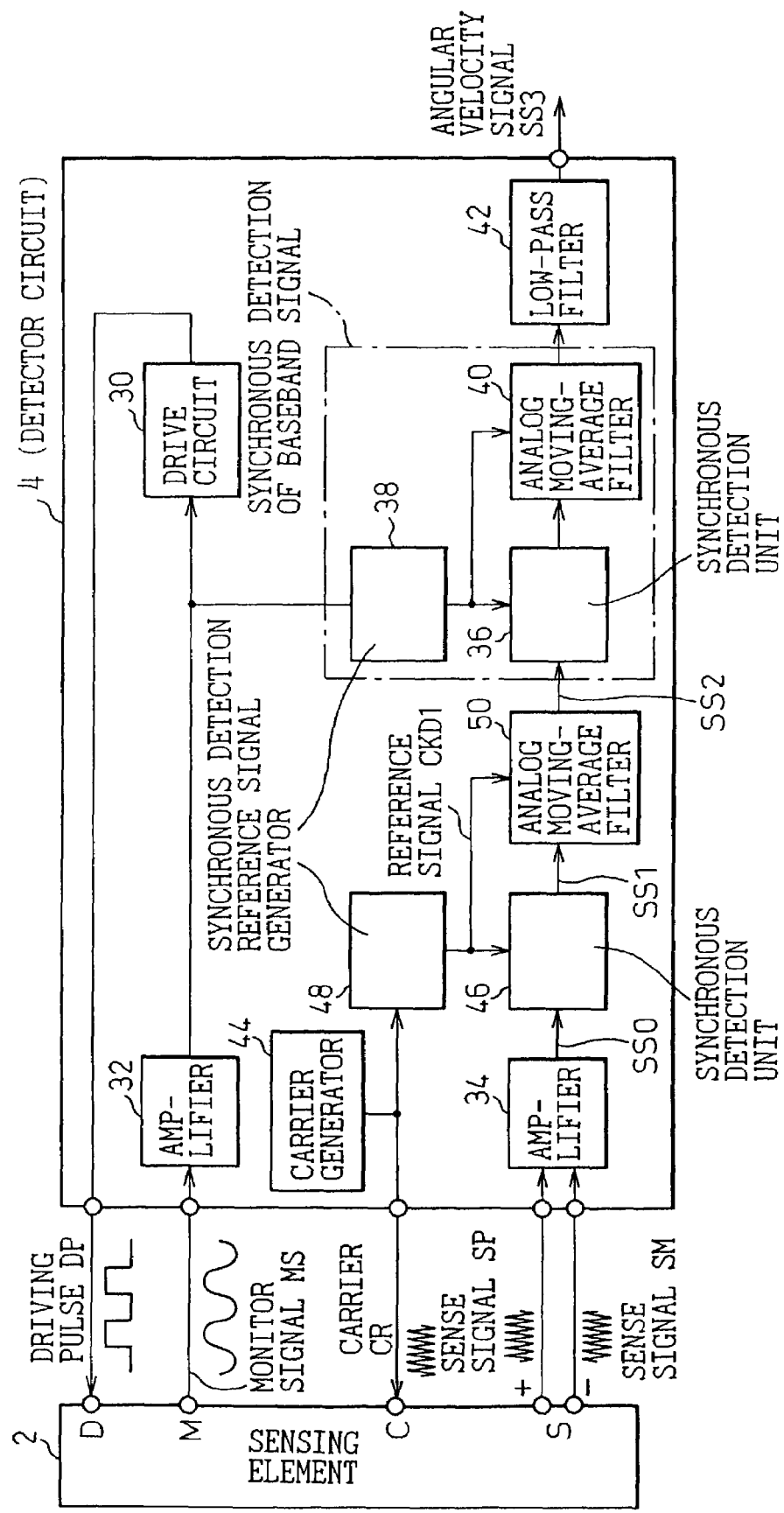
FIG. 7 is a block diagram showing the configuration of an angular velocity detector to which the second embodiment is adapted.

FIG. 7 is a block diagram showing the overall configuration of an angular velocity detector to which the second embodiment is adapted.

The angular velocity detector to which the present embodiment is adapted has basically the same configuration as the angular velocity detector to which the first embodiment is adapted. Differences from the first embodiment will be described below. Namely, the vibrator 16 included in the sensing element 2 is vibrated with a driving signal that is produced by superposing a carrier CR on a driving pulse DP produced by the drive circuit 30. The frequency of the carrier CR is higher than the frequency of the driving pulse DP (for example, 1 MHz). Thus, the carrier CR is superposed on the sense signals SP and SM that are produced by the sensing element 2 (eventually, on the sense signal SS0 produced by the differential amplifier 34). The sense signal SS0 produced by the differential amplifier 34 is detected using the reference signal CKD synchronous with the carrier CR. Consequently, the finally produced angular velocity signal SS3 is unaffected by a low-frequency (generally 10 kHz or less) 1/f noise occurring in the differential amplifier 34.

In the angular velocity detector to which the present embodiment is adapted, the detector circuit 4 includes a carrier generator 44 for generating the carrier CR. The carrier CR generated by the carrier generator 44 is transferred to the sensing element 2 through a carrier input terminal C.

Figure 8:
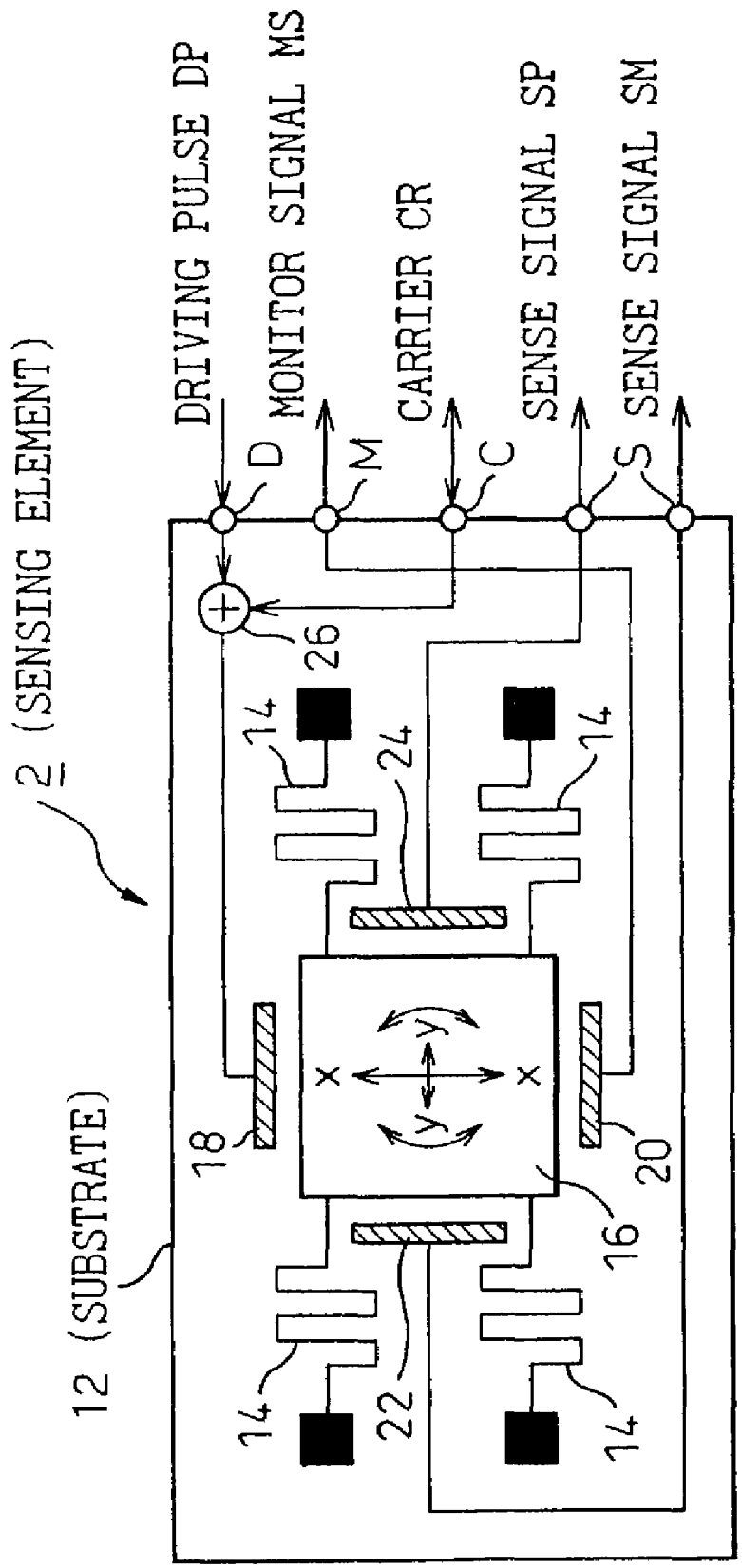
FIG. 8 is an explanatory diagram for explaining the structure of a sensing element included in the second embodiment.

The sensing element 2 includes, as shown in FIG. 8, a mixer 26 that superposes the carrier CR received through the carrier input terminal C on the driving pulse DP received through the driving terminal D. A synthetic signal of the driving pulse DP and carrier CR produced by the mixer 26 is applied to the driving electrode 18 as a driving signal with which the vibrator 16 is driven. Alternatively, the mixer 26 may be included in the detector circuit 4.

Moreover, the detector circuit 4 includes, similarly to the one included in the first embodiment, a circuit that detects a baseband signal synchronously with the monitor signal MS. The circuit consists of the synchronous detection unit 36, synchronous detection reference signal generator 38, and analog moving-average filter 40. Moreover, the detection circuit includes a circuit that detects the sense signal SS0 using the reference signal CKD1 synchronous with the carrier CR. The circuit is disposed in a stage preceding the above circuit.

Similarly to the circuit for detecting a baseband signal synchronously with the monitor signal, the circuit consists of a synchronous detection reference signal generator 48, a synchronous detection unit 46, and an analog moving-average filter 50. The synchronous detection reference signal generator 48 fetches the carrier CR generated by the carrier generator 44 and generates a reference signal CKD1 synchronous with the carrier CR. The synchronous detection unit 46 uses the reference signal CKD1 to detect the sense signal SS0 produced by the differential amplifier 34. The analog moving-average filter 50 produces an analog moving average of the detection signal SS1 produced by the synchronous detection unit 46 by sampling the detection signal 221 during one cycle of the reference signal CKD1.

Specifically, the detector circuit 4 included in the present embodiment is designed to perform, in two steps, a high-speed synchronous detection that is detection synchronous with the carrier CR and relatively low-speed synchronous detection that is detection synchronously with the driving pulse DP (or in other words, the monitor signal MS).

Figure 9:
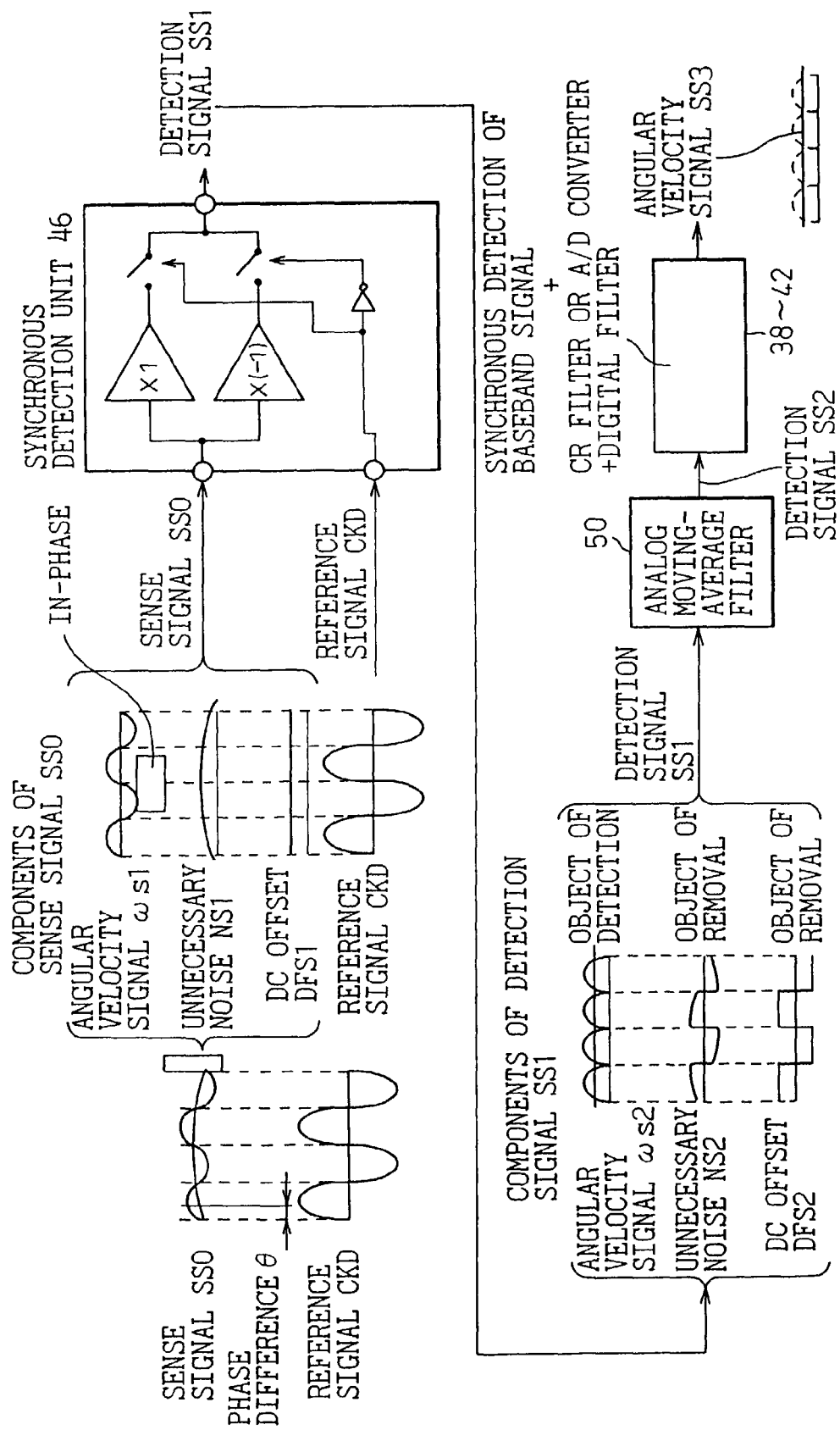
FIG. 9 is an explanatory diagram for explaining the waveforms of signals detected at various points in a detection circuit included in the second embodiment.

The second-step synchronous detection (synchronous detection of a baseband signal) is identical to that performed in the first embodiment. The first-step synchronous detection (synchronous detection based on the carrier CR) will be briefly described in conjunction with FIG. 9.

To begin with, the sense signal SS0 produced by the differential amplifier 34 contains, as shown in FIG. 3, in addition to the angular velocity signal component $\omega s1$ that is an object of detection, the unnecessary noise component NS1 whose frequency is lower than the angular velocity signal component $\omega s1$, and the dc offset component DFS1. Herein, as the carrier CR is superposed on the angular velocity signal component $\omega s1$, the frequency of the angular velocity signal component $\omega s1$ is higher by one to three digits than the frequency of the angular velocity signal component $\omega s1$ employed in the first embodiment.

The synchronous detection unit 46 detects the sense signal SS0 using the reference signal CKD1 synchronous with the carrier CR. Consequently, the angular velocity signal component $\omega s1$ is converted into a dc signal $\omega s2$ whose waveform resembles the waveform of a sine wave having undergone full-wave rectification. The positive and negative half-cycles of each of the unnecessary noise component NS2 and dc offset component DFS2 that are contained in the sense signal detected to be synchronous with the reference signal become substantially identical to each other. Therefore, an average of the positive and negative half-cycles becomes substantially zero.

According to the present embodiment, the detection signal SS1 detected to be synchronous with the reference signal based on the carrier CR is transferred to the analog moving-average filter 50. The analog moving-average filter 50 produces an analog moving average of the detection signal SS1 by sampling the detection signal during one cycle of the reference signal CKD1 that is used for synchronous detection.

Consequently, even during the first-step synchronous detection, high-frequency noise components stemming from synchronous detection and a dc offset component can be removed fully. Moreover, the unnecessary noise component NS2 can be minimized by producing a moving average.

A low-frequency noise component that cannot be removed through synchronous detection is removed through the second-step synchronous detection of a baseband signal or by the operation of the low-pass filter 42. Consequently, the finally produced angular velocity signal SS3 contains a very little noise.

Even in the present embodiment, a high-order CR filter requiring a large time constant need not be used to remove high-frequency noises stemming from synchronous detection. The detector circuit 4 can therefore be designed to be compact and low-cost.

Similarly to the analog moving-average filter 40 employed in the first embodiment, a frequency divider may be used to produce a signal whose frequency equals a fraction 1/m (where m denotes a positive integer) of the frequency of the reference signal CKD1 used by the synchronous detection unit 46. The low-frequency signal may then be transferred to the analog moving-average filter 50 so that the analog moving-average filter 50 will operate in the timing of the low-frequency signal. As the analog moving-average filter 50 need not be operated at a high speed synchronously with the high-frequency carrier CR, the cost of the analog moving-average filter 50 itself can be reduced.

Third Embodiment

FIG. 10 is a block diagram showing the overall configuration of an angular velocity detector to which the third embodiment is adapted.

The angular velocity detector to which the present embodiment is adapted is basically identical to the one to which the first embodiment is adapted. Differences from the first embodiment will be described below. Namely, a time-domain analog-to-digital (A/D) converter with the capability of a filter 60 is included for realizing the capability of an analog moving-average filter. The temporal A/D converter with the capability of a filter 60 is used to produce an analog moving average of the detection signal SS1. The result of the production is A/D converted. Moreover, a digital moving average of digital data Da produced by the temporal A/D converter 60 is produced using a digital moving-average filter 80. Consequently, digital data DT is transmitted as the angular velocity signal SS3.

The foregoing differences will be described below.

Figure 11A:
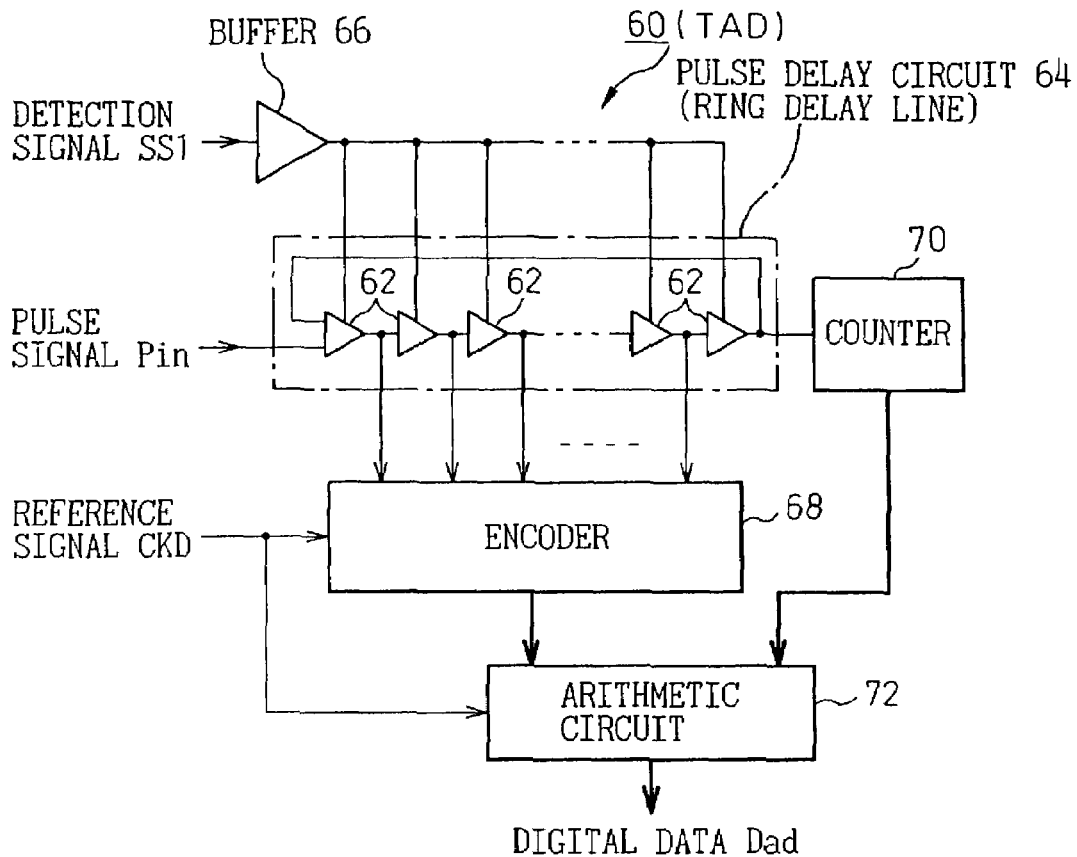
FIG. 11A and FIG. 11B are explanatory diagrams showing the configurations of a time-domain A/D converter and a digital moving-average filter included in the third embodiment.

The time-domain A/D converter 60 consists mainly, as shown in FIG. 11A, of a pulse delay circuit 64, a buffer 66, an encoder 68, a counter 70, and an arithmetic circuit 72. The pulse delay circuit 64 has a plurality of stages of delay units 62 connected in the form of a loop. The delay unit 62 delays a pulsating signal Pin by a predetermined delay time and transfers the pulsating signal to the next-stage delay unit. The buffer 66 transfers the detection signal SS1 as a driving voltage to the delay units 62 constituting the pulse delay circuit 64. The encoder 68 detects a position, in the pulse delay circuit 64, at which the pulsating signal is present, at the leading (or trailing) edge of the reference signal CKD. The encoder 68 then produces digital data representing the position. The counter 70 counts the number of times of circulation by which the pulsating signal has circulated through the pulse delay circuit 64. The arithmetic circuit 72 latches output data, which is sent from the encoder 68 and counter 70, at the leading (or trailing) edge of the reference signal CKD. The arithmetic circuit 72 calculates the number of delay units 62 through which the pulsating signal Pin has passed during one cycle of the reference signal CKD by checking the difference between the output data and previously latched data. The arithmetic circuit 72 then transmits the result of the calculation as digital data Dad that represents an analog moving average of the detection signal.

The delay units 62 constituting the pulse delay circuit 64 are formed with gate circuits each including an inverter or the like. The edge of a pulsating signal that makes a high-to-low transition or a low-to-high transition is applied to the pulse delay circuit 64 as the pulsating signal Pin. The delay unit 62 delays the edge of the pulsating signal Pin by a predetermined delay time, and transfers it to the next-stage delay unit 62. Thus, the pulsating signal Pin is circulated through the pulse delay circuit 64.

In the thus-configured temporal A/D converter 60 included in the present embodiment, the delay time to be produced by each delay unit 62 is proportional to the voltage level of the detection signal SS1. If a high-frequency noise component is superposed on the detection signal SS1, the delay time to be produced by each delay unit 62 varies depending on the high-frequency noise component.

Specifically, when a positive high-frequency noise component is superposed on the detection signal SS1, the delay time to be produced by the delay unit 62 through which the pulsating signal Pin passes gets shorter than the delay time to be produced normally when the high-frequency noise component is not superposed on the detection signal SS1. In contrast, when a negative high-frequency noise component is superposed on the detection signal SS1, the delay time to be produced by the delay unit 62 through which the pulsating signal Pin passes gets longer than the delay time to be produced normally.

In the time-domain A/D converter 60 employed in the present embodiment, therefore, the encoder 68, counter 70, and arithmetic circuit 72 are used to detect the number of stages of delay units 62 through which the pulsating signal Pin has passed during one cycle of the reference signal CKD. The result of the detection (the number of delay units 62 through which the pulsating signal Pin has passed) is transmitted as digital data Dad that represents a result of A/D conversion performed on the detection signal SS1.

In other words, the delay time to be produced by the delay units 62 constituting the pulse delay circuit 64 varies depending on the voltage level of the detection signal SS1. A variation of the delay time caused by a high-frequency noise component superposed on the detection signal SS1 is canceled (or in other words, averaged) by transferring the pulsating signal Pin successively to the delay units 62 constituting the pulse delay circuit 64. According to the present embodiment, therefore, one cycle of the reference signal CKD is regarded as a sampling cycle. The number of delay units 62 through which the pulsating signal Pin has passed during the sampling cycle is detected, thus producing digital data Dad (D1, D2, etc.) equivalent to a moving average of voltage levels which the detection signal SS1 assumes during one cycle of the reference signal CKD.

The temporal A/D converter 60 has both the capability of the analog moving-average filter 40 that removes a high-frequency noise component from the detection signal SS1 and the capability of an A/D converter that converts the voltage levels of the detection signal SS1 into digital data Dad. The attenuation characteristic the temporal A/D converter 60 serving as the analog moving-average filter offers is identical to the one the analog moving-average filter 40 offers as shown in FIG. 4. Namely, a maximum (theoretically infinite) magnitude of attenuation is attained relative to frequencies equal or close to an integral multiple of the frequency of the reference signal CKD.

Even the angular velocity detector to which the present embodiment is adapted can provide the same advantages as the one to which the first embodiment is adapted.

Figure 11B:
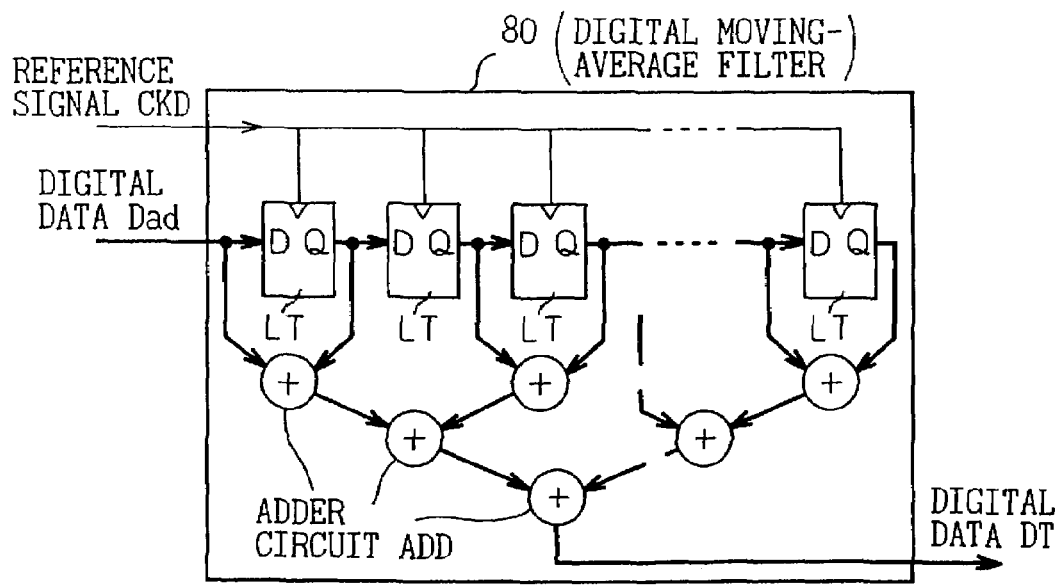

On the other hand, the digital moving-average filter 80 is included as an auxiliary filter that substitutes for the low-pass filter 42 included in the first embodiment and that removes a noise component which has not been removed by the time-domain A/D converter 60. For example, as shown in FIG. 11B, the digital moving-average filter 80 includes a plurality of stages of latch circuits LT and an adder ADD. The latch circuits LT operate synchronously with the reference signal CKD and successively latch digital data Dad sent from the temporal A/D converter 60. The adder ADD adds up the outputs of the latch circuits LT. A moving average of the digital data Dad is produced.

To be more specific, the digital moving-average filter 80 uses the plurality of stages of latch circuits LT to sequentially sample the digital data Dad synchronously with the reference signal CKD. The adder ADD adds up a plurality of sampled digital data items Dad. The data items Dad are averaged and transmitted as digital data DT that represents a real angular velocity.

Figure 12A:
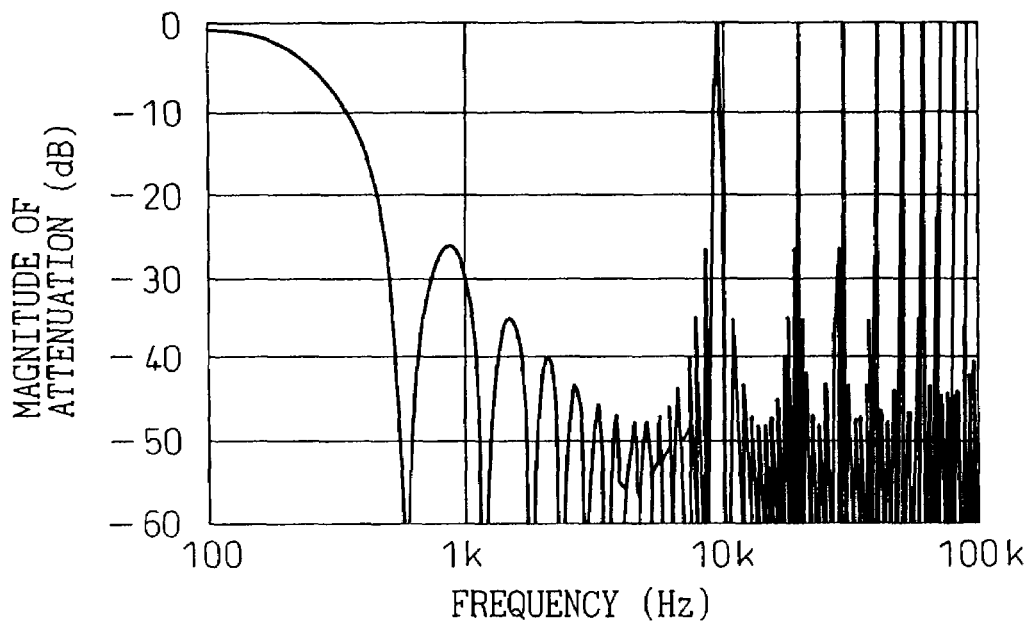
FIG. 12A and FIG. 12B are explanatory diagrams showing the attenuation characteristic of a digital moving-average filter and the synthetic attenuation characteristic of a time-domain A/D converter and a digital moving-average filter.

According to the present embodiment, the time-domain A/D converter 60 and digital moving-average filter 80 are actuated synchronously with the common reference signal CKD. This is because, as mentioned previously, the analog moving-average filter (time-domain A/D converter 60 in the present embodiment) attains a maximum (theoretically infinite) magnitude of attenuation relative to frequencies equal or close to an integral multiple of a sampling rate. However, as shown in FIG. 12A, the digital moving-average filter 80 provides a substantially zero magnitude of attenuation relative to the frequencies equal or close to the integral multiple of the sampling rate.

Figure 12B:
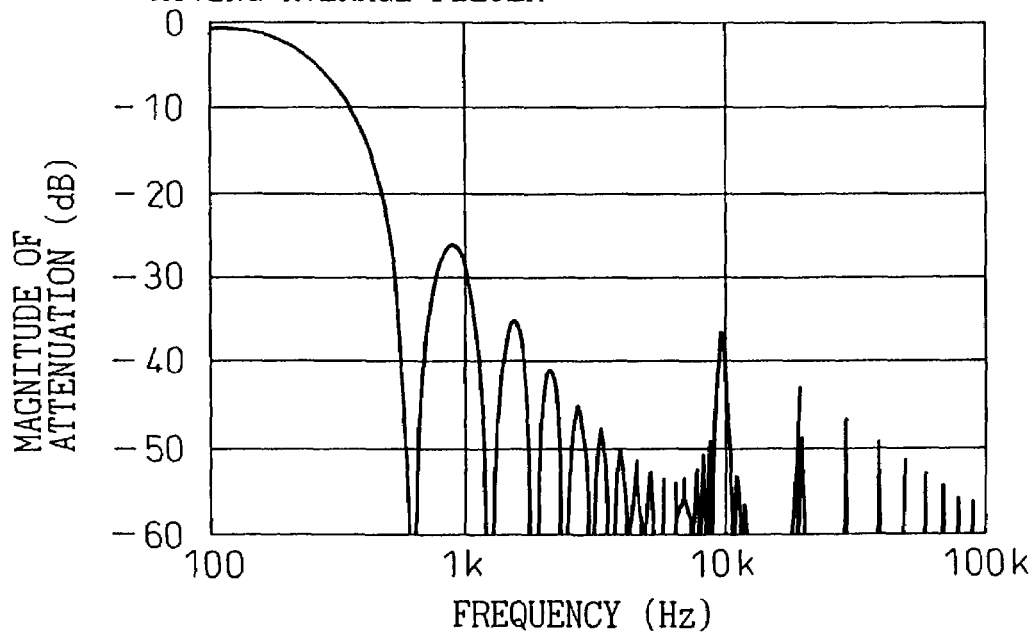

In other words, the frequencies relative to which the digital moving-average filter 80 provides the substantially zero magnitude of attenuation may be deviated from the frequencies relative to which the analog moving-average filter (temporal A/D converter 60) provides the maximum magnitude of attenuation. In this case, a noise component the analog moving-average filter (TAD 60) has failed to remove may pass through the digital moving-average filter 80 as it is. According to the present invention, the sampling rate at which the filters acquire samples agree with the frequency of the reference signal CKD. Therefore, a synthetic attenuation characteristic offered by a combination of the filters demonstrates, as shown in FIG. 12B, that the filters can remove noise components more efficiently.

The sampling rate at which the digital moving-average filter 80 acquires samples need not agree with the sampling rate at which the analog moving-average filter (temporal A/D converter 60) acquires samples. The sampling rate may be set to an n multiple (where n denotes a positive integer) of the sampling rate at which the analog moving-average filter (time-domain A/D converter 60) acquires samples. Nevertheless, the same advantages as the aforesaid ones can be provided.

Similarly to the analog moving-average filter 40 included in the first embodiment, a frequency divider 90 may be included for producing a signal whose frequency equals a fraction 1/m of the frequency of the reference signal CKD employed by the synchronous detection unit 36. The signal may be transferred to the time-domain A/D converter, and the time-domain A/D converter 60 may thus be activated at the timing of the signal whose frequency is lower than the reference signal CKD.

In this case, the digital data Dad produced by the temporal A/D converter 60 (or more particularly, the number of delay units 62 through which the pulsating signal Pin passes within the pulse delay circuit during one cycle of the reference signal) assumes a large value. This results in a high voltage resolution attained through A/D conversion.

The embodiments of the present invention have been described so far. The present invention is not limited to the embodiments but may be adapted to various working modes.

For example, when the digital moving-average filter 80 is substituted for the final-stage low-pass filter 42, the digital moving-average filter 80 may not be realized with the digital circuit shown in FIG. 11B but may be realized with an arithmetic operation (so-called annealing) to be performed by a microcomputer that is included in a control unit. Moreover, the low-pass filter 42 need not always be included. If the analog moving-average filter (or time-domain A/D converter) can successfully suppress unnecessary noises, the low-pass filter 42 may be excluded.

Moreover, in the aforesaid embodiments, a synchronous detection method and device in accordance with the present invention are adapted to an angular velocity detector. The synchronous detection method and device in accordance with the present invention may be adapted to a sensor signal detector other than the angular velocity detector. Otherwise, the synchronous detection method and device in accordance with the present invention may be adapted to a communication system, a system employing a carrier, or a general synchronous detection system.

What is claimed is:

1. A synchronous detection method for removing high-frequency noise from a signal detected to be synchronous with a reference signal, wherein:
    an input signal is detected using a reference signal of a predetermined frequency; and
    an analog moving average of the input signal detected to be synchronous with the reference signal is produced by sampling the input signal during one cycle of the reference signal or one cycle of a signal whose frequency equals a fraction 1/m of the frequency of the reference signal.

2. A synchronous detection method according to claim 1, wherein the signal produced as an analog moving average is filtered using a low-pass filter in order to remove a residual noise.

3. A synchronous detection method according to claim 2, wherein: digital moving-average calculation is substituted for filtering to be performed by said low-pass filter; and
    the digital moving-average production is such that: the signal produced as an analog moving average is A/D converted; the A/D converted signal is sampled during a cycle corresponding to the cycle during which samples are acquired for producing an analog moving average or during a 1/n of the cycle; and a plurality of past samples is averaged.

4. A synchronous detection method according to claim 3, wherein:
    the signal detected to be synchronous with the reference signal is applied to a pulse delay circuit, which has a plurality of stages of delay units connected in tandem, as a signal to be used to control a delay time produced by each delay unit;
    a pulsating signal is applied to said pulse delay circuit, and is transferred sequentially while being delayed by a delay time produced by each delay unit;
    the number of stages of delay units through which the pulsating signal has passed within said pulse delay circuit is counted during one cycle of the reference signal or one cycle of a signal whose frequency equals a fraction 1/m (where m denotes a positive integer) of the frequency of the reference signal; and
    said pulse delay circuit is thus used to concurrently perform analog moving-average calculation on the signal detected to be simultaneous with the reference signal and A/D conversion on the signal produced as an analog moving average.

5. A synchronous detection device comprising:
    a synchronous detection circuit for detecting an input signal using a reference signal of a predetermined frequency; and
    an analog moving-average filter for calculating a moving average of the input signal, which is detected to be simultaneous with the reference signal, by sampling the input signal during one cycle of the reference signal or one cycle of a signal whose frequency equals a fraction 1/m of the frequency of the reference signal.

6. A synchronous detection device according to claim 5, further comprising a low-pass filter that filters the signal produced as an analog moving average by said analog moving-average fitter so as to remove residual noise.

7. A synchronous detection method according to claim 6, further comprising an analog-to-digital converter that A/D converts the signal produced as an analog moving average, wherein:
    a digital moving-average filter, that samples data produced by said A/D converter during a cycle corresponding to the cycle during which samples are acquired for producing an analog moving average or during an 1/n (where n denotes a positive integer) of the cycle so as to calculate an average of a plurality of past samples, is substituted for said low-pass filter.

8. A synchronous detection method according to claim 7, wherein: a time-domain A/D converter with the capability of a filter is substituted for said analog moving-average filter and said AID converter;
    said time-domain A/D converter with the capability of a filter includes a pulse delay circuit that has a plurality of stages of delay units, each of which delays an input pulse by a delay time proportional to the signal detected to be synchronous with the reference signal and transfers the input pulse, connected in tandem, and that transmits a pulsating signal while delaying the pulsating signal by the delay time produced by each delay unit, and a count means that counts the number of stages of delay units through which the pulsating signal has passed within said pulse delay circuit during one cycle of the reference signal or one cycle of a signal whose frequency equals a fraction 1/m of the frequency of the reference signal; and said time-domain A/D converter with the capability of a filter transmits a count value produced by said count means as digital data representing the signal detected to be synchronous with the reference signal.

9. A sensor signal detector comprising:
a drive means for driving a sensing element with a driving signal that has a carrier superposed thereon;
a first reference signal generation means for generating a first reference signal, which is used for synchronous detection, according to the carrier; and
a first synchronous detection means for detecting a detection signal sent from said sensing element using the first reference signal, and generating a sensor signal that represents a physical quantity detected using said sensing element, wherein:
a synchronous detection device set forth in any of claims 5 to 8 is adopted as said first synchronous detection means.

10. A sensor signal detector comprising:
a drive means for driving a sensing element with a driving signal of a predetermined frequency;
a second reference signal generation means for detecting the driven state of said sensing element from the driving signal or a monitor signal sent from said sensing element, and generating a second reference signal, which is used for synchronous detection, from the driving signal or monitor signal;
a second synchronous detection means for detecting a detection signal sent from said sensing element using said second reference signal and generating a sensor signal that represents a physical quantity detected using said sensing element, wherein:
a synchronous detection device set forth in any of claims 5 to 8 is adopted as said second synchronous detection means.

11. A sensor signal detector comprising:
a drive means for driving a sensing element with a driving signal of a predetermined frequency;
a carrier superposition means for superposing a carrier, of which frequency is higher than the frequency of the driving signal, on the driving signal which said drive means produces and uses to drive said sensing element;
a second reference signal generation means for detecting the driven state of said sensing element from the driving signal or a monitor signal sent from said sensing element, and generating a second reference signal, which is used for synchronous detection, from the driving signal or monitor signal;
a first reference signal generation means for generating a first reference signal, which is used for synchronous detection, according to the carrier which said carrier superposition means superposes on the driving signal,
a first synchronous detection means for detecting a detection signal sent from said sensing element using the first reference signal; and
a second synchronous detection means for detecting the signal, which is detected to be synchronous with the reference signal by said first synchronous detection means, using the second reference signal, and generating a sensor signal that represents a physical quantity detected using said sensing element, wherein:
a synchronous detection device set forth in any of claims 5 to 8 is adopted as said first synchronous detection means and second synchronous detection means.

12. A sensor signal detector according to claim 10 or 11, wherein said sensing element is a vibrator included in a vibratory gyroscope.

* * * * *

UNITED STATES PATENT AND TRADEMARK OFFICE
CERTIFICATE OF CORRECTION

PATENT NO. : 7,068,744 B2
APPLICATION NO. : 10/216980
DATED : June 27, 2006
INVENTOR(S) : Takamoto Watanabe Page 1 of 1

It is certified that error appears in the above-identified patent and that said Letters Patent is hereby corrected as shown below:

Col. 17, line 66, claim 1, after "1/m" insert --(where m denotes a positive integer)--

Col. 18, line 45, claim 5, after "1/m" insert --(where m denotes a positive integer)--

Col. 18, line 49, claim 6, "fitter" should be --filter--

Col. 19, line 10, claim 8, after "1/m" insert --(where m denotes a positive integer)--

Signed and Sealed this

Twelfth Day of December, 2006

JON W. DUDAS
*Director of the United States Patent and Trademark Office*